Feb. 7, 1933.  W. A. LEWIS  1,897,022
COMPENSATED RELAY SYSTEM FOR GROUND FAULTS
Filed March 9, 1931   5 Sheets-Sheet 1

Fig. 1.

WITNESSES:

INVENTOR
William A. Lewis
BY
ATTORNEY

Fig. 2.

Feb. 7, 1933.  W. A. LEWIS  1,897,022
COMPENSATED RELAY SYSTEM FOR GROUND FAULTS
Filed March 9, 1931  5 Sheets-Sheet 3

Negative Sequence Network

Zero-Sequence Network

INVENTOR
William A. Lewis
BY
ATTORNEY

Patented Feb. 7, 1933

1,897,022

UNITED STATES PATENT OFFICE

WILLIAM A. LEWIS, OF WILKINSBURG, PENNSYLVANIA, ASSIGNOR TO WESTINGHOUSE ELECTRIC & MANUFACTURING COMPANY, A CORPORATION OF PENNSYLVANIA

COMPENSATED RELAY SYSTEM FOR GROUND FAULTS

Application filed March 9, 1931. Serial No. 521,153.

My invention relates to relay systems for protecting transmission lines against ground faults, and it has particular relation to such a system utilizing compensating devices for supplying a reactance relay with a modified current or a modified voltage in order to compensate for the effects of varying conditions external of the line-section between two relaying points, so that a very accurate discrimination is obtained, between ground faults which are located between the relaying point and the "balance point" of the relay 1, which may be taken to be close to the far end of the line-section, and ground faults which are located beyond the said "balance point".

Heretofore, single-phase ground faults have been the most difficult faults to relay, because no satisfactory distance-responsive relaying system has been known for responding accurately to the distance of such a fault from the relaying point. My analysis shows that this has been true, because the voltage and the current in the faulted conductor are dependent on positive and negative phase-sequence line-currents and line-impedances, as well as zero phase-sequence line-currents and impedances; and because the voltage and the current in the faulted conductor are also dependent upon the amount of zero phase-sequence current which is fed into the fault from the remote end of the line, this current being widely variable depending upon the grounding conditions on the transformers located beyond the remote end of the line-section which is being protected.

The difficulties encountered in ground fault relaying have been so great that heretofore it has been necessary to rely upon the element of time as a means for discriminating between ground faults at different distances, for certain positions of faults. In former times, when slow circuit-breaker speeds were utilized, the introduction of the time element was not particularly objectionable. But, with the advent of modern high-speed circuit breakers clearing faults in twelve cycles or less on a 60-cycle system, and in modern relaying systems requiring relay speeds much less than circuit breaker speeds, whereby faults are cleared from a line before the line has had time to swing out of step, so far as possible, time-discrimination of ground faults can no longer be tolerated if it can possibly be avoided. My invention provides a high-speed or instantaneous ground relaying system which discriminates between single-phase ground faults at different distances, without relying upon the element of time.

The object of my present invention is to remove the foregoing difficulties in a relaying system which possesses the virtues of simplicity and reliability, both of which characteristics are necessary in any successful relay installation.

With the foregoing and other objects in view, my invention consists in the apparatus, systems and methods hereinafter described and claimed, and illustrated in the accompanying drawings, wherein

Figures 3, 4, 5, 6, 7:
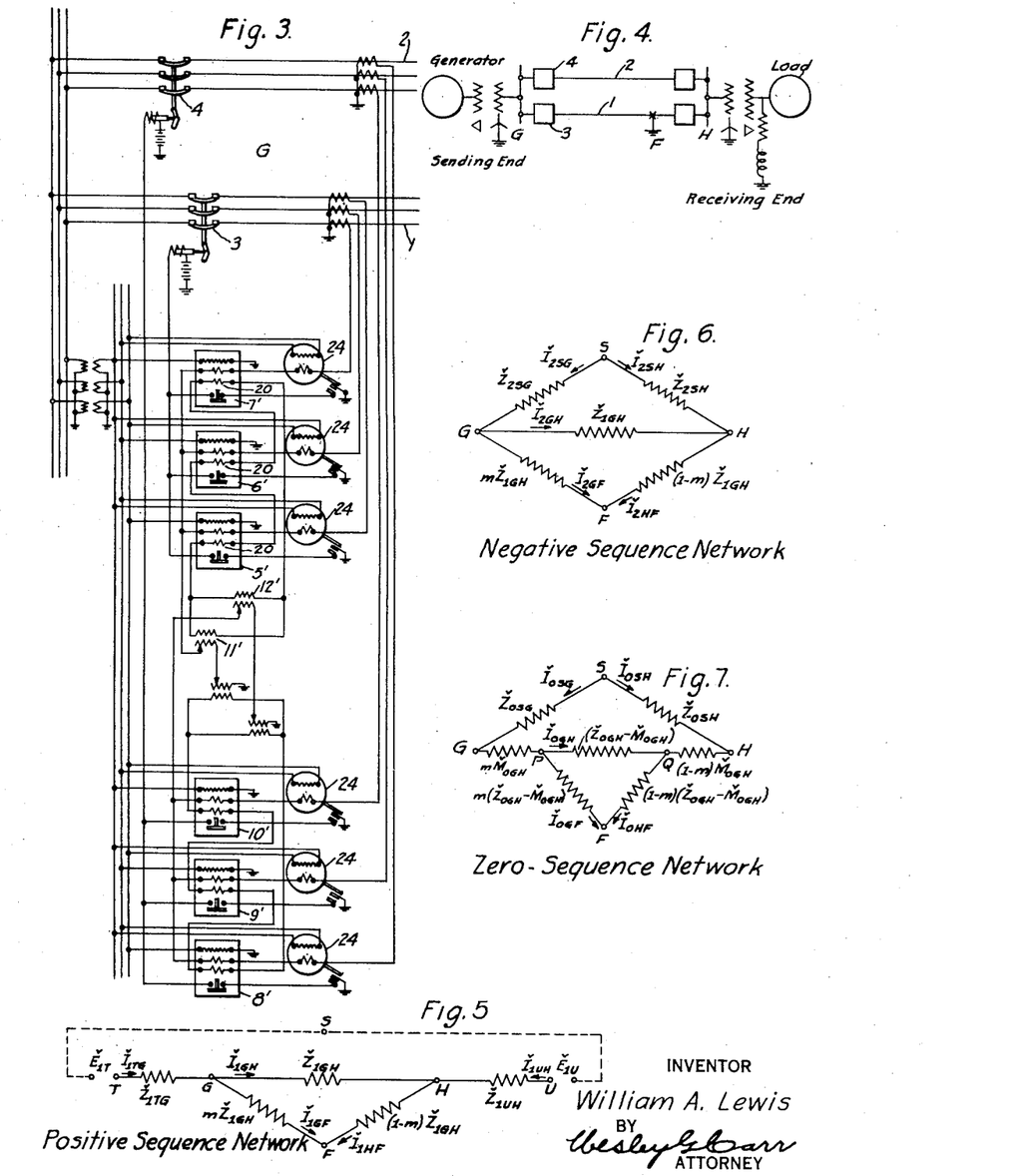
Fig. 3 is a view similar to Fig. 1 showing a modified reactance relay having two current coils, resulting in greater simplicity in the circuit connections.
Fig. 4 is a single-line diagram of an assumed equivalent system representing a transmission system of the type to which my invention is particularly applicable.
Figs. 5, 6 and 7 are the sequence networks for the assumed transmission system.

Before attempting to describe my particular relaying system, I shall develop certain necessary formulas, assuming, for this purpose, a typical two-circuit three-phase transmission system, as shown in Fig. 4, with a source of power at each end of the line. The two three-phase lines between stations G and H are represented by single lines, with bussing of the two lines assumed at these two points. The remainder of a system, at each end of the line-section GH, has been represented by a single, equivalent circuit and a single, equivalent generator. Adequate grounding is assumed at both ends of the line-section, although, from the standpoint of the following theory, it may be either solid or through impedance. The distributed capacitance of the transmission lines has been neglected, in accordance with the usual practice in the calculation of short-circuit currents, no substantial error being thereby introduced because the length of the line-section is, in general, not great enough to cause the charging currents to have much effect. However, the simplification of assuming both generating sources to be in phase is not permissible, since the phase relations of the various currents and voltages have an important bearing on the results. The relay operation is considered from the standpoint of the relays at the substation G.

In order to calculate the fault currents and voltages during unbalanced faults, it is desirable to utilize the well-known method of symmetrical components. It is necessary to set up sequence networks for the flow of positive, negative and zero sequence currents, corresponding to the system under investigation, and this has been done in Figs. 5, 6 and 7. The positive and negative sequence networks comprise a group of impedances having a branch corresponding to every branch of the single-line diagram. Synchronous machines are represented by their equivalent circuits for a single phase, with single-phase voltages inserted at the proper points. Since synchronous machines generate only positive-sequence voltages, generated voltages appear only in the positive-sequence network. In the positive-sequence network, two voltages $E_{1T}$ and $E_{1U}$ are inserted to represent the voltages generated by the equivalent synchronous machines at T and U respectively. The impedance of each branch of the networks is represented by the symbol Z with three subscripts, the first a number indicating the sequence network in which the impedance appears, and the second and third the points between which the impedance is measured. As $E_{1T}$ and $E_{1U}$ are expressed in terms of line-to-neutral voltage, the other terminals of these voltages are connected to the common neutral S of the positive-sequence network.

In the negative-sequence network, these generated voltages are equal to zero, so that the terminals T and U may be omitted and the impedances connected directly to the corresponding point S. For all static apparatus the negative-sequence impedance is equal to the positive, so that the branches between G and H, corresponding to the transmission line, will have the same impedance. This has been represented by substituting $Z_{1GH}$ for $Z_{2GH}$ in Fig. 6.

The fault is assumed to occur at F, intermediate between G and H, at a fraction $m$ of the distance from G to H. Since the impedance from G to H of one line has been taken as a unit, and since, neglecting distributed capacitance, the impedance is proportional to the distance, the impedances from G to F become $mZ_{1GH}$ and from F to H become $(1-m)Z_{1GH}$. As the branches between T and G and between H and U contain synchronous machine impedances, they will in general be different for the different sequences.

The zero-sequence network is made up only of those branches which may carry current having an earth return path and, therefore, in general it has a smaller number of branches. The corresponding impedances are also usually quite different and generally larger, altho in certain special cases, such as grounding transformers, the zero-sequence impedance to ground may be less than the corresponding positive and negative sequence impedances. The zero-sequence network for the system shown in Fig. 4 is given in Fig. 7. Since adequate grounding has been assumed at each end of the system, branches are required from G and H to S. In the positive and negative sequence networks the mutual impedance between two parallel lines is generally small enough to be neglected, but in the zero-sequence network this is not true, due to the wide separation between the conductors and the ground return compared to the spacing between the two parallel lines. Because of the common use of the earth return and ground wires, the mutual impedance may also contain a resistance component. The mutual impedance is, therefore, represented by the vector symbol $M_{0GH}$. It is well known that two circuits, having a mutual impedance between them and connected together at one end, may be replaced by three impedances connected in star, the branch connected to the original junction being equal to the mutual impedance and the other branches being equal to the original branches minus the mutual impedance. Use is made of this property in setting up the zero-sequence impedances between stations G and H and the fault F. The symbols for impedance are similar to those used in the positive and negative sequence networks except that the first subscript is now 0 instead of 1 or 2.

The current flowing in the various branches of the networks are indicated by the symbol I with three subscripts, the first a number (1, 2 or 0) indicating the sequence of the current, and the second and third letters indicating the stations between which the current is flowing, the assumed positive direction being from the station indicated by the first letter toward the one indicated by the final letter.

If a ground fault occurs as F on phase $a$ of line 1, it can be readily shown that the voltage between conductor and ground, at the relay station G, is (1) $E_{aG} = mZ_{1GH}(I_{1GF} + I_{2GF}) + mZ_{0GH}I_{0GF} + mM_{0GH}I_{0GH} + 3RI_{0F}$ where the symbols have the following meaning.

$I_{1GF}$ = Positive-sequence current from G to fault.
$I_{2GF}$ = Negative-sequence current from G to fault.
$I_{0GF}$ = Zero-sequence current from G to fault.
$I_{0GH}$ = Zero-sequence current from G to H in the unfaulted line. This current may be positive or negative in direction depending upon conditions.
$I_{0F}$ = Total zero-sequence current at fault = $I_{0GF} + I_{0HF}$ = ⅓ (total fault current).
$Z_{1GH}$ = Positive-sequence impedance of one line from G to H.
$Z_{0GH}$ = Zero-sequence impedance of one line from G to H.
$M_{0GH}$ = Zero-sequence mutual impedance between the line being protected and each of the other parallel lines, from G to H.
$m$ = Fractional distance from G to H at which fault occurs, measured from G.
$R$ = Fault resistance.

The negative-sequence impedance does not appear, since, for the line alone, it is the same as the positive-sequence impedance and has been replaced by the latter.

Let us factor $mZ_{1GH}$ out of the above expression, exclusive of the final term. Then:

(2) $E_{aG} = mZ_{1GH}\{I_{1GF} + I_{2GF} + \dfrac{Z_{0GH}}{Z_{1GH}}I_{0GF} + \dfrac{M_{0GH}}{Z_{1GH}}I_{0GH}\} + 3RI_{0F}$ Let us also add and subtract $I_{0GF}$ from the quantity in the braces. Then we have:

(3) $E_{aG} = mZ_{1GH}\{I_{1GF} + I_{2GF} + I_{0GF} + \dfrac{(Z_{0GH} - Z_{1GH})}{Z_{1GH}}I_{0GF} + \dfrac{M_{0GH}}{Z_{1GH}}I_{0GH}\} + 3RI_{0F}$ But (4) $I_{1GF} + I_{2GF} + I_{0GF} = I_{aGF}$, the current flowing in line $a$ from G to the fault. Thus (5) $E_{aG} = mZ_{1GH}\{I_{aGF} + \dfrac{(Z_{0GH} - Z_{1GH})}{Z_{1GH}}I_{0GF} + \dfrac{M_{0GH}}{Z_{1GH}}I_{0GH}\} + 3RI_{0F}$ When a fault occurs at any given location, it is desired that the relay measure a quantity which depends only on the location of the fault and is independent of generator capacity, number of lines in service, etc. Let is assume, for the moment, that the fault resistance, R, is zero. Then we can readily see that if we can use for tripping a relay-current $I_R$ equal to the quantity in braces, we will obtain the desired result from an impedance relay. The measured impedance is (6) $Z_R = \dfrac{E_{aG}}{I_R} = mZ_{1GH}$ under the conditions just assumed. Since $Z_{1GH}$ is a constant and $m$ is the fractional distance to the fault, the measured quantity is directly proportional to the distance of the fault from G.

Let us examine the possibility of making the relay-current, $I_R$, equal to the quantity in braces. The first term is the current in the faulted conductor. $I_{0GF}$ is ⅓ of the residual current in the faulted line and $I_{0GH}$ is ⅓ of the residual current in the unfaulted line. The ratio $$\dfrac{Z_{0GH} - Z_{1GH}}{Z_{1GH}}$$

depends only on the characteristics of the line, being independent of conditions outside of the line-section GH, and is therefore essentially constant. Likewise, the ratio $$\dfrac{M_{0GH}}{Z_{1GH}}$$

is essentially constant. Therefore, the proper proportions of $I_{0GF}$ and $I_{0GH}$ may be added to the current in the faulted conductor to make the relay-current $I_R$ equal to the quantity in braces. In general $Z_{0GH}$, $M_{0GH}$, $Z_{1GH}$ will have nearly the same phase angle, at least for lines of low relative resistance, and if we assume this to be true, the fractions become pure numbers instead of complex quantities. In this case, the additional current components can be added to $I_{aGF}$ by means of adjustable-ratio transformers inserted in the leads carrying the proper residual currents, respectively.

We previously assumed that the fault resistance was zero. In general, however, this is not the case, and a fault resistance, R, variable over wide limits enters in. If we give $I_R$ the value suggested above, namely (7) $I_R = I_{aGF} + \dfrac{Z_{0GH} - Z_{1GH}}{Z_{1GH}}I_{0GF} + \dfrac{M_{0GH}}{Z_{1GH}}I_{0GH}$ then the impedance measured by the relay becomes (8) $Z_R = mZ_{1GH} + 3\dfrac{I_{0F}}{I_R}R.$ The currents $I_{0F}$ and $I_R$ will usually be nearly in phase, so that their ratio will be nearly a pure number. Consequently, the final term of $Z_R$ will be practically a pure resistance. This suggests the use of a reactance relay instead of an impedance relay, so that the resistance term can be discounted. Assuming that the final term is a pure resistance, the reactance relay will measure (9)  $X_R = mX_{1HG}$.

This quantity is a constant of the circuit and depends only on the distance from the station to the fault. It is, therefore, independent of the generator capacity connected to the line, or other conditions outside of the line-section GH, provided only, that the tripping current is sufficient to give adequate energy for operating the relay. If the parallel line is out of service, it will produce no effect on the voltage $E_{aG}$. Likewise, its residual current will be zero, so that the final term of $I_R$ in (7) is also zero. In the same manner as for two lines, the effects of additional lines can be provided for. Hence, the quantity measured can be made independent of the number of parallel lines in service.

Figure 1:
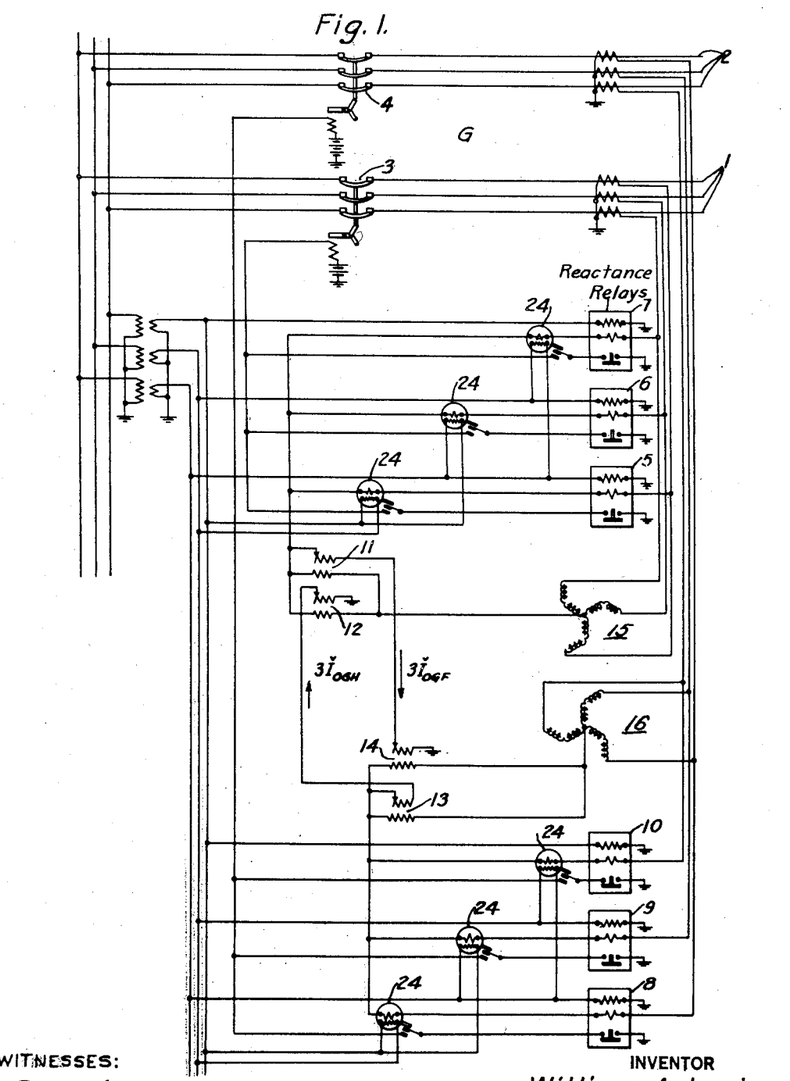
Figure 1 is a diagrammatic view of circuits and apparatus embodying my invention in a compensated-current relaying system for protecting a transmission line against single-phase ground faults.

Fig. 1 is a diagram of connections of the relaying equipment at station G, in accordance with Equation (7). Only the equipment for protecting the transmission line against single-phase ground faults is shown, as my present invention relates primarily to such equipment. It will be understood that the usual, or any suitable, relaying equipment will be utilized for responding to double-phase ground faults, line-to-line phase faults and 3-phase faults. Lines 1 and 2 are provided with circuit breakers 3 and 4, respectively, which are tripped by reactance relays 5, 6, 7 and 8, 9, 10, respectively. It is preferred to use reactance relays which respond only to the reactive component of the line impedance, although any type of impedance relay may be utilized. A suitable reactance relay for the purpose is described in my application, Serial No. 588,782, filed January 25, 1932.

The reactance relays 5 to 10 are energized from the line-to-neutral voltage on the faulted conductor at the relaying station G and the corresponding line current, the latter being modified, as set forth in Equation (7), by means of two variable-ratio transformers 11 and 12, for line 1, and 13 and 14 for line 2. The primary windings of the transformers 11 and 14 are energized by the residual line current in the faulted line (assumed to be line 1), its residual current being equal to $3I_{0GF}$. The primary windings of the transformers 13 and 12 are energized from the residual line current of the parallel line or lines, being equivalent to $3I_{0GH}$ of the formulas. The transformation ratio of the transformers 11 and 13 is $$\frac{Z_{1GH}}{Z_{0GH} - Z_{1GH}}$$

and the transformation ratio of the transformers 12 and 14 is $$\frac{Z_{1GH}}{M_{0GH}}.$$

The two secondary windings of the transformers 11 and 12 are connected in parallel and jointly supply additional currents which divide equally in the three reactance relays 5, 6 and 7 and return through a suitable grounding transformer, such as an interconnected-star transformer bank 15. In like manner, the secondary windings of the transformers 13 and 14 are connected in parallel and jointly supply additional currents in a circuit including the current windings of the three reactance relays 8, 9 and 10 and a second interconnected-star transformer 16.

Other means may be used to obtain the same or equivalent results. For example, instead of the single-interconnected star auxiliary transformer, and two adjustable-ratio transformers for each set of relays, six adjustable-ratio transformers of three times the ratio cited above may be used, and the additional current introduced directly into each relay coil, individually, as indicated in Fig. 8.

Figure 8:
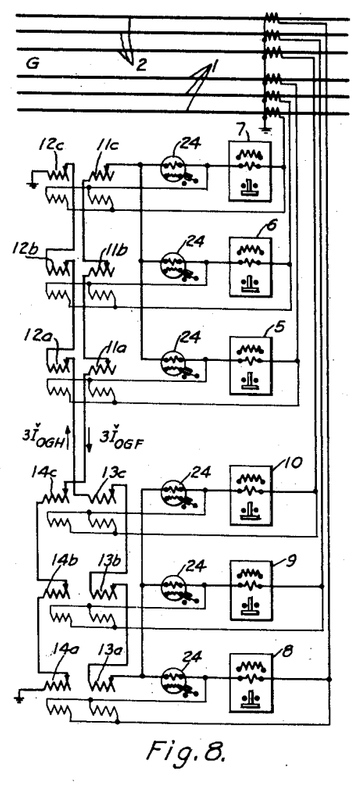
Figs. 8, 9 and 10 are diagrammatic views illustrating modifications.

Thus, in Fig. 8, the current-coil of the reactance relay 5 is shunted by the secondary windings of the auxiliary current-transformers 11a and 12a; the current-coil of the relay 6 is shunted by the secondary windings of the auxiliary current-transformers 11b and 12b; the current-coil of the relay 7 is shunted by the secondary windings of the auxiliary current-transformers 11c and 12c; the current-coil of the relay 8 is shunted by the secondary windings of the auxiliary current-transformers 13a and 14a; the current-coil of the relay 9 is shunted by the secondary windings of the auxiliary current-transformers 13b and 14b; and the current-coil of the relay 10 is shunted by the secondary windings of the auxiliary current-transformers 13c and 14c. The primary windings of the auxiliary current-transformers 11c, 11b, 11a, 14c, 14b, 14a are connected in the neutral connections of the main current-transformers of line 1, thus being traversed by the residual current $3I_{0GF}$. The primary windings of the other auxiliary current-transformers 13a, 13b, 13c, 12a, 12b, 12c are connected in the neutral connections of the main current-transformers of the parallel line 2, thus being traversed by the residual current $3I_{0GH}$. Fig. 8 shows only the current-transformer connections, the other connections being as in Fig. 1.

Another method which may be utilized for introducing the current compensation effects is shown in Fig. 3 and involves the utilization of an additonal current coil 20 on each of the reactance relays. The additional currents which are supplied by the secondary windings of the current transformers 11' and 12' (for line 1, for example), are fed directly into the three additional current coils of the corresponding relays 5', 6' and 7', in series, thus avoiding the use of the interconnected-star transformers. It will be noted that, in this case, the ratios of the auxiliary transformers 11' and 12' are three times the ratios stated for Fig. 1, because the secondary currents are fed directly into the reactance relays instead of dividing among the three relays in parallel.

In Figs. 1, 3 and 8, I have also indicated a group of directional relay elements 24 which are essentially contacting wattmeter elements having their current coils energized by the same current as the corresponding reactance relay, (either with or without the additional compensating current components) and having their voltage coils energized, preferably, across the opposite delta-phase voltage, thus causing the directional relay 24 to respond to the reactive KVA flowing out into the line away from the station G or toward the station G. If desired, the phase of the voltage coil of the directional element may be modified, as by using series impedance devices, in such direction as to slightly increase the torque tending to close the relay contacts for high-power-factor currents, flowing away from the relay. The directional relay structure is preferably that shown in the application of Shirley L. Goldsborough entitled "High-speed impedance-responsive relays", Serial No. 448,937, filed May 1, 1930. While a preferred directional relay system is shown, it will be understood that any known, or suitable, system for this purpose may be utilized.

The foregoing methods of compensating the reactance ground relays, to render them substantially unresponsive to any conditions outside of the line-section GH, have operated on the current side of the reactance relay. It is possible, also, to modify the voltage which is utilized for relaying purposes. Thus, if we subtract the quantities $$n(Z_{0GH} - Z_{1GH})I_{0GF} \text{ and } nM_{0GH}I_{0GH}$$

from both sides of Equation (5) where $n$ is the fractional distance from the relay to the balance point, we obtain (10) $E_{aG} - n(Z_{0GH} - Z_{1GH})I_{0GF} - nM_{0GH}I_{0GH} = mZ_{1GH}I_{aGF} - (n-m)(Z_{0GH} - Z_{1GH})I_{0GF} - (n-m)M_{0GH}I_{0GH} + 3RI_{0F}.$ If we use $I_{aGF}$, the current in the faulted line-conductor, for tripping, and the left-hand side of Equation (10) for the relay voltage, thus—

(11) $E_R = E_{aG} - n(Z_{0GH} - Z_{1GH})I_{0GF} - nM_{0GH}I_{0GH},$ the measured impedance will be (12) $Z_R = mZ_{1GH} - (n-m)\{(Z_{0GH} - Z_{1GH})\frac{I_{0GF}}{I_{aGF}} + M_{0GH}\frac{I_{0GH}}{I_{aGF}} + 3R\frac{I_{0F}}{I_{aGF}}\}.$ It is necessary to have relays of the high-speed type measure a definite relaying quantity accurately only at the balance point, provided that, for faults nearer to the relay, the quantity measured by the relay does not exceed the value for the balance point, and conversely, for faults more remote, the quantity measured does not fall below that for the balance point, since if the quantity is less, the relay will trip regardless of how much less, and if greater, will not trip.

Referring to Equation (12), at the balance point, $m=n$, the measured impedance will be (13) $Z_R = nZ_{1GH} + 3R\frac{I_{0F}}{I_{aGF}}.$ Making the assumption, which is practically valid, that $I_{0F}$ is in phase with $I_{aGF}$, a reactance relay would measure (14) $X_R = nX_{1GH}.$ Equation (12) shows that, for any value of $m$ other than $m=n$, an additional term is introduced. Both the real and the imaginary parts of $Z_{0GH}$ are always greater than the corresponding parts of $Z_{1GH}$, for an overhead line, and hence the term $(Z_{0GH} - Z_{1GH})$ will always be positive. Also $I_{0GH}$ is never greater than $I_{0GF}$, although it may have the opposite direction for small values of $m$. Furthermore $M_{0GH}$ is generally less than $(Z_{0GH} - Z_{1GH})$. Consequently it will quite generally be true that the quantity in braces is positive. Hence the additional term will be negative for $m$ less than $n$ and positive for $m$ greater than $n$. This will improve the operation in the neighborhood of the balance point, since the rate of change of impedance with distance becomes greater than the ratio of the impedance of the section to the length of the section.

One difficulty, however, is introduced for faults near the relay, in that the additional term is negative in sign and greater in value than the principal term $mZ_{1GH}$, because $m$ is now small. The additional term may possibly be greater than $nZ_{1GH}$ in magnitude for $m=0$, so that an impedance relay may not operate at all, even if the fault resistance, R, is zero. However, several forms of reactance relays will operate satisfactorily, since they have the characteristic of tripping for a higher value of reactance in the reverse direction than in the forward direction. Of course, provision must be made to cause the directional elements to close for outgoing faults, even though the reactance measured is negative. This is accomplished by using an uncompensated potential for the directional elements. The modified reactance relay described in my previously mentioned application is suitable for this purpose.

Figure 2:
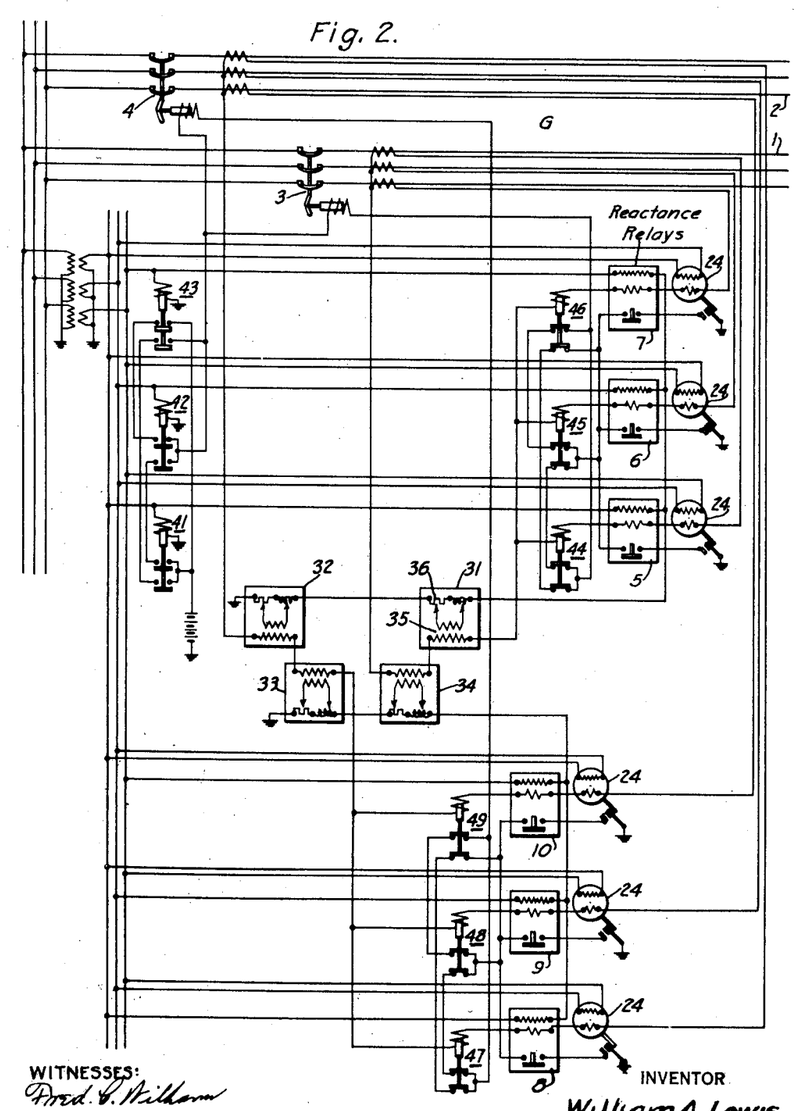
Fig. 2 is a similar view showing a compensated-voltage relaying system for the same purpose, and also including lock-out means for rendering the equipment inoperative when more than one line-conductor is faulted, this means, or its equivalent, being applicable to all of the embodiments of my invention.

Fig. 2 is a wiring diagram of apparatus at station G embodying the principles just discussed, involving voltage compensation of the reactance relays. The symbols are the same as in Fig. 1, except as noted in the following description.

The reactance relays 5 and 10 are energized with the respective line currents and with the corresponding line-to-neutral voltages, the latter being compensated, however, by means of line-drop compensators 31 and 32, for line 1 and 33 and 34 for line 2, these compensators being placed in the neutral circuits of the voltage-coils of the respective reactance relays. The compensators 31 and 34 are energized by the residual currents of the line 1, the same being equal to $3I_{0GF}$. The compensators are so arranged that the current circuits, (which are insulated from the voltage circuits by one-to-one ratio insulating transformers 35), introduce large circulating currents, (which are fifty to one hundred times as large as the currents in the voltage relays) in a variable resistance and reactance impedance 36, so as to introduce an impedance drop in the voltage circuit, proportional to the currents which are fed into the compensator and also proportional to the setting of the variable impedances.

Considering, for example, the two compensators 31 and 32 associated with line 1, the compensator 31 introduces a voltage component $n(Z_{0GF}-Z_{1GH})I_{0GH}$ into the neutral circuit of the voltage coils of the corresponding reactance relays 5 to 7, and the compensator 32 introduces a voltage component $nM_{0GH}I_{0GH}$ into the same circuit. It will be noted that the compensators 32 and 33 are supplied with the residual currents of line 2, which are equal to $3I_{0GH}$.

The ratios of the compensators 33 and 34 for line 2 will be the same as the ratios for the compensators 31 and 32, respectively.

Figure 9:
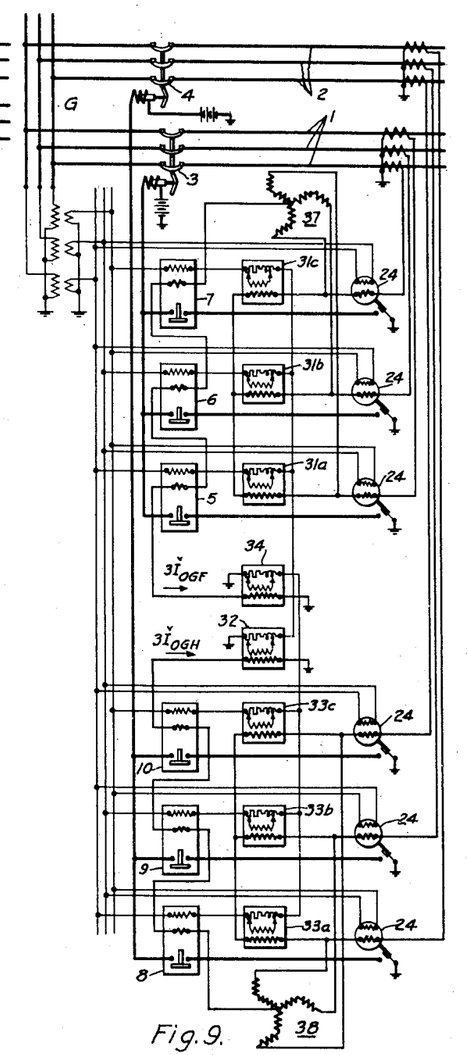

Other combinations may be used to obtain equivalent results. For example as shown in Fig. 9, the zero sequence current may be used to provide the tripping impulse, and the line drop compensators to remove the components in the voltage produced by the positive and negative sequence currents, for a fault at the balance point. For this purpose, it is necessary to energize the primary of the line drop compensator from a current equal to the line current less its zero sequence component, the latter having been removed by a zig-zag transformer or equivalent means. In this case the voltage produced by one compensator becomes $nZ_{1GH}(I_{1GF}+I_{2GF})$, the other compensator which takes care of the effect of mutual impedance being the same as before. This method requires four compensators for each of two parallel lines instead of the two for the method described above.

Thus, subtracting the compensator voltages $nZ_{1GH}(I_{1GF}+I_{2GF})$ and $nM_{0GH}I_{0GH}$ from both sides of equation (2), and dividing by the zero-sequence current $I_{0GF}$, we have the relay-measured impedance, (15) $Z_R = mZ_{0GH} - (n-m)\left\{Z_{1GH}\dfrac{I_{1GF}+I_{2GF}}{I_{0GF}} + M_{0GH}\dfrac{I_{0GH}}{I_{0GF}}\right\} + 3R\dfrac{I_{0F}}{I_{0GF}}.$ Referring to Fig. 9, the compensator 32 introduces a voltage component $nM_{0GH}I_{0GH}$ into the neutral circuit of the voltage coils of the reactance relays 5, 6, 7 of line 1, the same as in Fig. 2, while the compensator 34 introduces a corresponding voltage component $nM_{0GH}I_{0GF}$ into the neutral circuit of the voltage coils of the reactance relays 8, 9, 10 of the other line 2. Zero-sequence current is supplied to the current coils of the reactance relays 7, 6, 5 and to the input terminals of the compensator 34 from the neutral of a zig-zag transformer 37 which by-passes this zero-sequence current from the input terminals of three compensators 31a, 31b, 31c, the output terminals of which introduce voltage components, $nZ_{1GH}(I_{aGF}-I_{0GF}) = nZ_{1GH}(I_{1GF}+I_{2GF}),$ $nZ_{1GH}(I_{bGF}-I_{0GF}) = nZ_{1GH}(\alpha^2 I_{1GF}+\alpha I_{2GF}),$ and $nZ_{1GH}(I_{cGF}-I_{0GF}) = nZ_{1GH}(\alpha I_{1GF}+\alpha^2 I_{2GF}),$ into the respective individual voltage-coil circuits of the three reactance relays 5, 6 and 7. The zig-zag transformer 38 and the compensators 33a, 33b and 33c perform similar functions for the relaying equipment of the other line 2.

Figure 10:
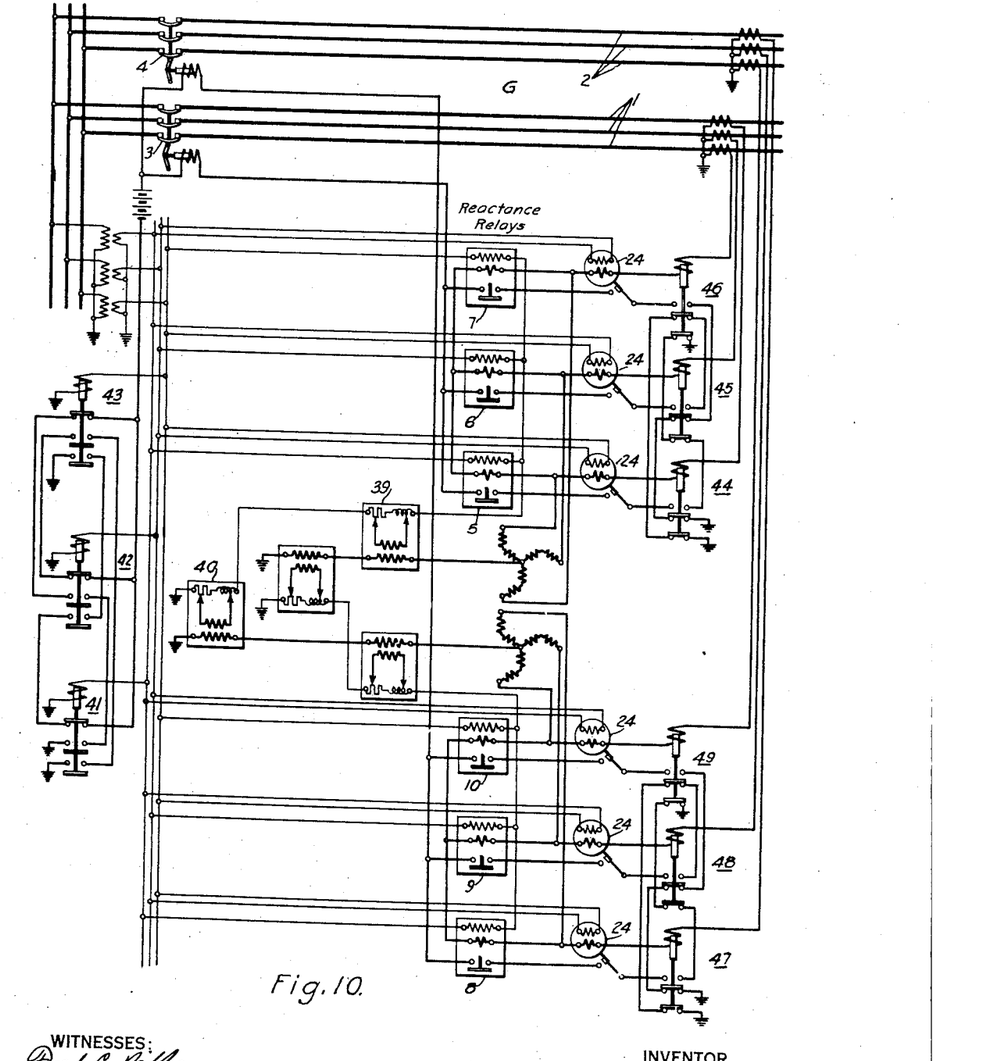

Still another method, as shown in Fig. 10, is to use the current $(I_{1GF}+I_{2GF})$ for supplying the tripping impulse, and energizing a compensator 39 from $I_{0GF}$ to produce a voltage $nZ_{0GH}I_{0GF}$, and a compensator 40 from $I_{0GH}$ to produce a voltage $nM_{0GH}I_{0GH}$, which can be subtracted from the voltage of equation (1), giving the relaying voltage, (16) $E_R = E_{aG} - nZ_{0GH}I_{0GF} - nM_{0GH}I_{0GH} = mZ_{1GH}(I_{1GF}+I_{2GF}) - (n-m)\{Z_{0GH}I_{0GF}+M_{0GH}I_{0GH}\} + 3RI_{0F}.$ The relay current $(I_{1GF}+I_{2GF})$ can be obtained by removing the zero sequence current $I_{0GF}$ from the current in the faulted line, by means of a zig-zag transformer 37 or other equivalent means. The scheme requires two line drop compensators 39 and 40 for each of two parallel lines.

Still other methods employing the above principle may be adopted. However, such schemes appear to be too complicated for commercial use and do not seem to offer any compensating advantages over the simpler schemes described in more detail above.

I have also made calculations, which need not be given in detail herein, to ascertain the behavior of my compensated ground relaying system in the event of double-ground faults and three-phase faults, and I find that, in general, my relaying system will not respond to such faults when they are located beyond the balance point for single-phase grounds. However, for some transmission lines, particularly for unusually short sections, it is occasionally possible for a double ground fault to trip my compensated ground relay even though the fault is beyond the aforesaid balance point.

In order to prevent this action, in such cases as said prevention may be necessary, I may add, to any of my compensating systems, any suitable means for locking out my ground relays in the event of a fault on more than one phase-conductor at any one time.

By way of illustration, I have shown such lockout means only in Figs. 2 and 10, but it is to be understood that it is applicable to any of the other figures, as well.

The particular lock-out means shown in Figs. 2 and 10 consists in a set of under-voltage relays 41, 42 and 43, energized from the line-to-neutral voltages of the system and so connected that when any two of them drop out, the tripping circuits of the circuit breakers will be open-circuited. I also provide a set of over-current relays for each line-circuit, as indicated at 44, 45, 46 and 47, 48, 49, respectively. These relays are energized from the line currents and are so connected that when any two of each of a set of three relays pick up, the tripping circuit of the circuit breaker associated with that line-circuit will be open-circuited. The under-voltage and over-current relays are utilized as a check on each other, in order to make sure that any fault occurring simultaneously on two or three phases, within the limitations of the relay settings, will prevent the tripping of the circuit breakers by means of my ground relays.

In the foregoing description, I have had reference to three-phase, commercial-frequency synchronous transmission systems, that is, systems utilizing synchronous dynamo-electric machines at each end thereof.

Where I refer to impedance relays, I mean, in general, any relays responsive to either the whole or any part of the impedance of the line up to a fault, referring either to the actual impedance of the line or to a sequential impedance component thereof.

My present invention is also described, in some respects more in detail, in a paper which is to be presented before the American Institute of Electrical Engineers on March 12, 1931, entitled "Fundamental basis of distance relaying".

The foregoing discussion has referred particularly to a two-circuit transmission system. When there are more than two lines, a separate compensation is introduced for the effects of the product of each of the zero sequence currents $I_{0GH}$ in each line parallelling the faulted line, and the zero-sequence mutual impedance $M_{0GH}$ between that parallel line and the faulted line which is being protected.

In the foregoing analysis, I have assumed that the relays are responsive only to the symmetrical or alternating-current portions of the voltage and current waves. Under certain conditions there is an additional direct-current transient component present in the relaying currents which may affect the action of very quick-acting relays. Means are known, where necessary, for shunting the unsymmetrical transient component of the fault current out of the current coils of the fault-distance-responsive relays, as set forth in an application of L. N. Crichton, Serial No. 422,965, filed January 23, 1930.

I claim as my invention:

1. A distance-responsive ground-fault relaying system for protecting a three-phase commercial-frequency synchronous transmission system having a plurality of transmission circuits with neutral grounding beyond both ends of a line-section between two successive sectionalizing stations, comprising the combination, with said transmission system, of a ground-fault-responsive impedance relay for each line-conductor, each relay balancing a current function of the faulty line-conductor against a voltage function of the same conductor, means for sectionalizing a faulty line-circuit in response to said impedance relay, said means including a directional element for causing said response only when the fault current is flowing out of the relaying station into the line-section, and means associated with said ground-fault-responsive impedance relays for modifying the balancing action of the same in response to a function of the residual current in the faulted line-circuit and the equivalent phase-sequence impedances of the faulted circuit and means for further modifying said balancing action in response to a function of the residual currents of each of the parallel circuits and the equivalent zero-sequence mutual impedance between said parallel circuit and the circuit being protected.

2. The invention as set forth in claim 1, characterized by said ground-fault-responsive impedance relays being reactance relays.

3. The invention as set forth in claim 1, characterized by said ground-fault-responsive impedance relays being reactance relays, the modifying means being operative on the current side of the ground-relay balance.

4. The invention as set forth in claim 1, characterized by said ground-fault-responsive impedance relays being reactance relays, the modifying means being operative on the current side of the ground-relay balance and developing compensating forces proportional substantially to $$\frac{Z_{0GH} - Z_{1GH}}{Z_{1GH}} I_{0GF} \text{ and } \frac{M_{0GH}}{Z_{1GH}} I_{0GH}$$

respectively, where $Z_{1GH}$ and $Z_{0GH}$ are the positive and zero sequence impedances of the faulted line-circuit being protected, $M_{0GH}$ is the zero-sequence mutual impedance between the line-circuit being protected and another parallel circuit, a separate compensation being introduced for each other parallel circuit if there are more than one of said parallel circuits, and $I_{0GF}$ and $I_{0GH}$ are the zero-sequence currents in the faulted and parallel lines, respectively.

5. The invention as set forth in claim 1, characterized by said ground-fault-responsive impedance relays being reactance relays, the modifying means being operative on the current side of the ground-relay balance and developing compensating currents, said reactance relays having auxiliary current coils, and circuit connections for circulating said compensating currents in said auxiliary current coils.

6. A distance-responsive ground-fault relaying system for protecting a three-phase commercial-frequency synchronous transmission system having a plurality of transmission circuits with neutral grounding beyond both ends of a line-section between two successive sectionalizing stations, comprising the combination, with said transmission system, of a ground-fault-responsive impedance relay for each line-conductor, each relay balancing a current function of the faulty line-conductor against a voltage function of the same conductor, means for sectionalizing a faulty line-circuit in response to said impedance relay, said means including a directional element for causing said response only when the fault current is flowing out of the relaying station into the line-section, and means associated with said ground-fault-responsive impedance relays for modifying the balancing action of the same in response to the residual current in the faulted line-circuit multiplied by a function of the equivalent phase-sequence impedances of the faulted circuit, and means for further modifying said balancing action in response to the residual currents of each of the parallel circuits multiplied by a function of the equivalent zero-sequence mutual impedance between said parallel circuit and the circuit being protected, the modifying means being operative on the current side of the ground-relay balance and developing compensating currents, the ground relays having auxiliary current coils, and circuit connections for circulating said compensating currents in said auxiliary current coils.

7. A distance responsive ground-fault relaying system for protecting a three-phase commercial-frequency synchronous transmission system having a plurality of transmission circuits with neutral grounding beyond both ends of a line-section between two successive sectionalizing stations, comprising the combination, with said transmission system, of a ground-fault-responsive impedance relay for each line-conductor, each relay balancing a current function of the faulty line-conductor against a voltage function of the same conductor, means for sectionalizing a faulty line-circuit in response to said impedance relay, said means including a directional element for causing said response only when the fault current is flowing out of the relaying station into the line-section, and auxiliary current-transformer means associated with said ground-fault-responsive impedance relays for modifying the balancing action of the same in response to the residual current in the faulted line-circuit multiplied by a function of the equivalent phase-sequence impedances of the faulted circuit, and auxiliary current-transformer means for further modifying said balancing action in response to the residual currents of each of the parallel circuits multiplied by a function of the equivalent zero-sequence mutual impedance between said parallel circuit and the circuit being protected.

8. The invention as set forth in claim 1, characterized by said ground-fault-responsive impedance relays being reactance relays, the modifying means being operative on the current side of the ground-relay balance and developing compensating currents proportional substantially to $$\frac{Z_{0GH}-Z_{1GH}}{Z_{1GH}}I_{0GF}$$

and $$\frac{M_{0GH}}{Z_{1GH}}I_{0GH},$$

respectively, where $Z_{1GH}$ and $Z_{0GH}$ are the positive and zero sequence impedances of the faulted line-circuit being protected, $M_{0GH}$ is the zero-sequence mutual impedance between the line-circuit being protected and another parallel circuit, a separate compensation being introduced for each other parallel circuit if there are more than one of said parallel circuits, and $I_{0GF}$ and $I_{0GH}$ are the zero-sequence currents in the faulted and parallel lines, respectively, said reactance relays having auxiliary current coils, and circuit connections for circulating said compensating currents in said auxiliary current coils.

9. The invention as set forth in claim 1, characterized by said ground-fault-responsive impedance relays being reactance relays, the modifying means being operative on the current side of the ground-relay balance and developing compensating currents, the modifying means including a pair of auxiliary current-transformers for each line-circuit, a grounding transformer connected across the three current-coil terminals of the three reactance relays for each line-circuit but unconnected to the neutral of the line-current transformers supplying said reactance relays, the two auxiliary current transformers having secondary windings connected in parallel to each other, with one terminal connected to the neutral point of said grounding transformer and with the other terminal connected to the neutral point of the relay current coils, the two auxiliary current transformers having primary windings being energized from the respective residual currents mentioned in claim 1.

10. The invention as set forth in claim 1, characterized by said ground-fault-responsive impedance relays being reactance relays, the modifying means being operative on the current side of the ground-relay balance, and developing compensating current in each reactance relay proportional substantially to $$\frac{Z_{0GH}-Z_{1GH}}{Z_{1GH}}I_{0GF}$$

and $$\frac{M_{0GH}}{Z_{1GH}}I_{0GH},$$

respectively, where $Z_{1GH}$ and $Z_{0GH}$ are the positive and zero sequence impedances of the faulted line-circuit being protected, $M_{0GH}$ is the zero-sequence mutual impedance between the line-circuit being protected and another parallel circuit, a separate compensation being introduced for each other parallel circuit if there are more than one of said parallel circuits, and $I_{0GF}$ and $I_{0GH}$ are the zero-sequence currents in the faulted and parallel lines, respectively, the modifying means including a pair of auxiliary current transformers for each line-circuit, a grounding transformer connected across the three current-coil terminals of the three reactance relays for each line-circuit but unconnected to the neutral of the line-current transformers supplying said reactance relays, the two auxiliary current transformers being secondary windings connected in parallel to each other, with one terminal connected to the neutral point of said grounding transformer and with the other terminal connected to the neutral point of the relay current coils, the two auxiliary current transformers having primary windings being energized from the respective residual currents mentioned in claim 1.

11. The invention as set forth in claim 1, characterized by said ground-fault-responsive impedance relays being reactance relays, the modifying means being operative on the voltage side of the ground-relay balance.

12. The invention as set forth in claim 1, characterized by said ground-fault-responsive impedance relays being reactance relays, the current coils of the reactance relays being responsive to the line-currents in the respective line-conductors, the modifying means being operative on the voltage side of the reactance-relay balance and developing compensating forces proportional substantially to $n(Z_{0GH}-Z_{1GH})I_{0GH}$ and $nM_{0GH}I_{0GH}$ respectively, where $n$ is the fractional distance from the relay to the balance point, $Z_{1GH}$ and $Z_{0GH}$ are the positive and zero sequence impedances of the faulted line-circuit being protected, and another parallel circuit, a separate compensation being introduced for each other parallel circuit if there are more than one of said parallel circuits, and $I_{0GF}$ and $I_{0GH}$ are the zero-sequence currents in the faulted and parallel lines, respectively.

13. The invention as set forth in claim 1, characterized by said ground-fault-responsive impedance relays being reactance relays, the modifying means being line-drop compensators.

14. The invention as set forth in claim 1, characterized by said ground-fault-responsive impedance relays being reactance relays, the modifying means being line-drop compensators connected in series to the voltage-coil circuits of the ground relays.

15. A quick-acting distance-responsive ground-fault relaying system for protecting a three-phase commercial-frequency synchronous transmission system having a plurality of transmission circuits with neutral grounding beyond both ends of a line-section between two successive sectionalizing stations, comprising the combination, with said transmission system, of a quick-acting ground-fault-responsive impedance relay for each line-conductor, each relay balancing a current function of the faulty line-conductor against a voltage function of the same conductor, means for sectionalizing a faulty line-circuit in response to said impedance relay, said means including a directional element for causing said response only when the fault current is flowing out of the relaying station into the line-section, and line-drop compensator means associated with said ground-fault-responsive impedance relays for modifying the balancing action of the same in response to the residual current in the faulted line-circuit multiplied by a function of the equivalent phase-sequence impedances of the faulted circuit, and line-drop-compensator means for further modifying said balancing action in response to the residual currents of each of the parallel circuits multiplied by a function of the equivalent zero-sequence mutual impedance between said parallel circuit and the circuit being protected.

16. The invention as set forth in claim 1, characterized by said ground-fault-responsive impedance relays being reactance relays, the current coils of the reactance relays being responsive to the line-currents in the respective line-conductors, the modifying means being line-drop compensators operative on the voltage side of the reactance-relay balance and developing compensating voltages.

17. The invention as set forth in claim 1, characterized by said ground-fault-responsive impedance relays being reactance relays, the current coils of the reactance relays being responsive to the line-currents in the respective line-conductors, the modifying means being line-drop compensators operative on the voltage side of the reactance-relay balance and developing compensating voltages proportional substantially to $n(Z_{0GH} - Z_{1GH})I_{0GF}$ and $nM_{0GH}I_{0GH}$, respectively, where $n$ is the fractional distance from the relay to the balance point, $Z_{1GH}$ and $Z_{0GH}$ are the positive and zero-sequence impedances of the faulted line-circuit being protected, and another parallel circuit, a separate compensation being introduced for each other parallel circuits, and $I_{0GF}$ and $I_{0GH}$ are the zero-sequence currents in the faulted and parallel lines, respectively.

18. The invention as set forth in claim 1, characterized by means operative only when more than one line-conductor is faulted to prevent the ground relays from actuating the sectionalizing means.

19. The invention as set forth in claim 1, characterized by said ground-fault-responsive impedance relays being reactance relays, and means operative only when more than one line-conductor is faulted to prevent the ground relays from actuating the sectionalizing means.

20. A distance-responsive ground-fault relaying system for protecting a three-phase, commercial-frequency synchronous transmission system having neutral grounding means beyond both ends of a line-section between two successive sectionalizing stations, comprising the combination, with said transmission system, of a ground-fault-reponsive impedance relay element for each line-conductor, each of said impedance relay elements including means for balancing a current-function of its own line-conductor against a voltage-function of the same conductor and including means for responding mainly to the reactance component of the quotient of said voltage-function divided by said current-function, and means for supplying said voltage-function and said current-function to each impedance relay element, one of said functions supplied by said means being a vectorial sum including a relaying current of the line-section being protected and a different function of the zero-sequence current of the line-section being protected, each of said impedance relay elements having a balance point within said line-section for single-phase ground faults.

21. A distance-responsive ground-fault relaying system for protecting a three-phase, commercial-frequency synchronous transmission system having neutral grounding means beyond both ends of a plurality of parallel line-sections between two successive sectionalizing stations, comprising the combination, with said transmission system, of a ground-fault-responsive impedance relay element for each line-conductor, each of said impedance relay elements including means for balancing a current-function of its own line-conductor against a voltage-function of the same conductor and including means for responding mainly to the reactance component of the quotient of said voltage-function divided by said current-function, and means for supplying said voltage-function and said current-function to each impedance relay element, one of said functions supplied by said means being a vectorial sum including a relaying current of the line-section being protected and a different function of the zero-sequence current of the line-section being protected and also a function of the zero-sequence component of the current in each of the line-sections which are in parallel to the line-section being protected, each of said impedance relay elements having a balance point within said line-section for single-phase ground faults.

22. A distance-responsive ground-fault relaying system for protecting a three-phase commercial-frequency synchronous transmission system having neutral grounding means beyond both ends of a plurality of parallel line-sections between two successive sectionalizing stations, comprising the combination, with said transmission system, of a ground-fault responsive impedance relay element for each line-conductor, each of said impedance relay elements including means for balancing a current-function of its own line-conductor against a voltage-function of the same conductor and including means for responding mainly to the reactance component of the quotient of said voltage-function divided by said current-function, and means for supplying said voltage-function and said current-function to each impedance relay element, one of the functions supplied by said means being a vectorial sum including a relaying current of the line-section being protected and a different function of the zero-sequence current of the line-section being protected and also a function of the zero-sequence component of the current in each of the line-sections which are in parallel to the line-section being protected, each of said impedance relay elements having a balance point within said line-section for single-phase ground faults, and means for sectionalizing the line-section being protected, in response to its impedance relay elements, said sectionalizing means comprising a directional means for causing said response only when the fault current is flowing out of the relaying station into the line-section being protected.

23. The invention as specified in claim 22, in combination with means for rendering said impedance relay elements effective if, and only if, a single-phase ground fault occurs on said transmission system.

24. A distance-responsive ground-fault relaying system for protecting a three-phase, commercial-frequency synchronous transmission system having a line-to-neutral voltage, in any phase, of $$E_{aG} = mZ_{1GH}(I_{aGF} - I_{0GF}) + mZ_{0GH}I_{0GF} + mM_{0GH}I_{0HG} + 3RI_{0F},$$

where $m$ = the ratio of the distance of the fault of the length of the line-section to be protected,
$Z_{1GH}$ = the mean of the substantially equal positive and negative sequential components of the self impedance of one three-phase line section to be protected,
$Z_{0GH}$ = the zero sequential component of said self impedance,
$I_{aGF}$ = the current in any particular line-conductor to which a relay element is connected,
$I_{0GF}$ = the zero-sequence current in the same,
$M_{0GH}$ = the zero sequential component of the mutual impedance between the three-phase line-section to be protected and any and all other line-sections in parallel therewith,
$I_{0GH}$ = the zero-sequence current in any and all other line-sections in parallel to the three-phase line section to be protected,
$R$ = the resistance at a single-phase ground fault, and
$I_{0F}$ = the zero-sequence current in the fault, comprising the combination, with said transmission system, of a ground-fault-responsive impedance relay element including means for balancing a current-function of its own line-conductor against a voltage-function of the same conductor and including means for responding mainly to the reactance component of the quotient of said voltage-function divided by said current-function, whereby the term containing the fault-resistance R and any and all other terms having a small, substantially wholly scalar, coefficient are substantially ineffective on the relay-response, said impedance relay element balancing at a distance $n$ times the length of the line-section to be protected, where $n$ is the fractional distance from the relay to the balance point, characterized by means for causing said voltage-function which is impressed upon the impedance relay element to be proportional to $E_{aG}$, and means for causing said current-function which is impressed upon the impedance relay element to be in substantially the same proportion to a composite quantity obtained substantially by dividing the right-hand side of said transmission-system equation, neglecting $3RI_{0F}$, by $m$ times one of said sequential impedance components.

25. A distance-responsive ground-fault relaying system for protecting a three-phase, commercial-frequency synchronous transmission system having a line-to-neutral voltage, in any phase, of $$E_{aG} = mZ_{1GH}(I_{aGF} - I_{0GF}) + mZ_{0GH}I_{0GF} + mM_{0GH}I_{0GH} + 3RI_{0F},$$

where $m$ = the ratio of the distance of the fault to the length of the line-section to be protected,
$Z_{1GH}$ = the mean of the substantially equal positive and negative sequential components of the self impedance of one three-phase line section to be protected,
$Z_{0GH}$ = the zero sequential component of said self impedance,
$I_{aGF}$ = the current in any particular line-conductor to which a relay element is connected,
$I_{0GF}$ = the zero-sequence current in the same,
$M_{0GH}$ = the zero sequential component of the mutual impedance between the three-phase line-section to be protected and any and all other line-sections in parallel therewith,
$I_{0GH}$ = the zero-sequence current in any and all other line-sections in parallel to the three-phase line section to be protected,
$R$ = the resistance at a single-phase ground fault, and
$I_{0F}$ = the zero-sequence current in the fault, comprising the combination, with said transmission system, of a ground-fault-responsive impedance relay element including means for balancing a current-function of its own line-conductor against a voltage-function of the same conductor and including means for responding mainly to the reactance component of the quotient of said voltage-function divided by said current-function, whereby the term containing the fault-resistance R and any and all other terms having a small, substantially wholly scalar, coefficient are substantially ineffective on the relay-response, said impedance relay element balancing at a distance $n$ times the length of the line-section to be protected, where $n$ is the fractional distance from the relay to the balance point, characterized by means for causing said voltage-function which is impressed upon the impedance relay element to be substantially proportional to $$E_R = E_{aG} - nM_{0GH}I_{0GH} - nf(I_{0GF}),$$

where $f(I_{0GF})$ is a function of $I_{0GF}$ such that, when $nM_{0GH}I_{0GH}$ and $nf(I_{0GF})$ are subtracted from both sides of said transmission-system equation, the right term will consist of $m$ times one of said sequential impedance components times the current-function which is impressed upon the impedance relay element, and some of the aforesaid additional terms which are substantially ineffective on the relay-response on account of the relay-response being mainly affected by the reactive component of the aforesaid quotient.

26. The invention as specified in claim 25, characterized by $f(I_{oGF})$ being $$(Z_{oGH}-Z_{1GH})I_{oGF},$$

and the current-function of the impedance relay elements being $I_{aGF}$.

27. The invention as specified in claim 25, characterized by $f(I_{oGF})$ being $$Z_{1GH}(I_{aGF}-I_{oGF}),$$

and the current-function of the impedance relay element being $I_{oGF}$.

28. The invention as specified in claim 25, characterized by $f(I_{oGF})$ being $Z_{oGH}I_{oGF}$, and the current-function of the impedance relay element being $(I_{aGF}-I_{oGF})$.

In testimony whereof, I have hereunto subscribed my name this 7th day of March 1931.

WILLIAM A. LEWIS.